United States Patent [19]

Reitmeier et al.

[11] 4,376,289

[45] Mar. 8, 1983

[54] SELF-ENABLING DROPOUT CORRECTOR

[75] Inventors: Glenn A. Reitmeier, Trenton; Frank J. Marlowe, Kingston, both of N.J.

[73] Assignee: RCA Corporation, New York, N.Y.

[21] Appl. No.: 201,058

[22] Filed: Oct. 27, 1980

[51] Int. Cl.³ ............................................. H04N 5/34
[52] U.S. Cl. .................................. 358/163; 358/314; 358/336; 360/38.1
[58] Field of Search ..................... 358/160, 163, 128.5, 358/127, 8, 21; 360/38

[56] References Cited

U.S. PATENT DOCUMENTS

| | | | |
|---|---|---|---|
| 2,996,576 | 8/1961 | Dolby . | |
| 3,463,874 | 8/1969 | Hodge et al. | 358/8 |
| 3,790,705 | 2/1974 | Kamin | 358/163 |
| 3,869,567 | 3/1975 | Covington | 358/163 |
| 3,952,326 | 4/1976 | Rotter | 358/8 |
| 4,021,852 | 5/1977 | Hurst et al. | 360/38 |
| 4,122,489 | 10/1978 | Bolger et al. | 358/8 |
| 4,137,547 | 1/1979 | Yamamitsu et al. | 358/8 |
| 4,158,855 | 6/1979 | Thomas et al. | 358/127 |
| 4,199,780 | 4/1980 | Taylor | 358/8 |
| 4,203,134 | 5/1980 | Christopher et al. | 358/8 |
| 4,288,817 | 9/1981 | Igel | 358/163 |

Primary Examiner—Richard Murray
Attorney, Agent, or Firm—E. M. Whitacre; W. H. Meise

[57] ABSTRACT

A dropout compensator includes an estimator for forming continuous estimates of the value of a video signal subject to dropouts. In order to determine the presence of a dropout, the estimated signal is compared with the actual signal to form a difference. When the difference exceeds a predetermined amount, the estimated value is substituted for the actual value.

11 Claims, 5 Drawing Figures

SELF-ENABLING DROPOUT CORRECTOR

BACKGROUND OF THE INVENTION

This invention relates to a dropout corrector which uses an estimate of the video being processed to determine the presence or absence of a dropout.

Video transmission channels may be subject to dropouts, which are short-duration decreases in signal level which may result in a total loss of signal. In a transmission channel including a broadcast portion, such a reduction in signal level might be described as "fading", and might be due to multipath effects attributable to atmospheric conditions or movable reflectors such as aircraft. In the case of a transmission channel including a tape recorder, the losses of signal or dropouts result chiefly from tape defects. A tape defect might be an area without magnetic oxide or it might be a lump of oxide which lifts the tape away from the recording or playback head in the region just before and just after the lump.

In analog video tape recording, small-scale variations in the response of the tape may produce noisy video. To avoid this, the video signal ordinarily frequency-modulates a radio frequency (RF) carrier signal which is then recorded onto the tape. The small variations in amplitude on playback are then stripped off by a limiter associated with the FM demodulator and the resulting video is substantially noise free. In such systems, a dropout reduces the amplitude of the RF carrier. Upon playback, the reduced signal strength of the carrier introduces noise into the demodulated video. This noise is introduced at least in part because the carrier signal level is so low that it cannot be limited by the limiters of the FM demodulator.

Prior art dropout correctors have used schemes which take advantage of the redundancy of the video signal by substituting for the video signal which occurs at the time of the dropout a signal derived in some fashion from the adjacent data. For example, in one prior art scheme, the presence of a dropout is detected by sensing the reduction of the magnitude of the RF carrier transduced by the pickup head which occurs during a dropout and when a preselected lower amplitude limit is reached, a controlled switch couples data from the preceding horizontal line as a substitute for the data occurring during the dropout as established by the RF signal amplitude criterion.

Digital video recording systems are presently being considered as substitutes for the analog recorders heretofore used. Digital video recording systems record series of pulses which collectively represent numbers which in turn represent the amplitude of the video signal from moment to moment (pixels). If these pulses were used to frequency-modulate an RF carrier, a dropout might be detected by operating on the RF carrier amplitude. It is desirable to directly record onto the tape the pulses representative of the video signal. When the pulses are directly recorded, a dropout causes the pulse amplitude to decrease. Since an RF carrier is not used in such a direct recording system, a continuous signal is not available which can be compared with a threshold to determine the presence of a dropout. Indeed, a complete dropout in a directly recorded system might be indistinguishable upon playback from an interpulse period of the digital signal.

A tape dropout will ordinarily occur over a tape length which would normally be occupied by a portion of the digital video signal representing several adjacent picture elements or pixels. Copending application Ser. No. 139,237, filed Apr. 11, 1980 for Clemens, et al. and entitled "TAPE FORMAT TO FACILITATE ERROR CONCEALMENT AND APPARATUS FOR RECORDING AND/OR REPLAYING SAME" describes a system in which the pulse groups of the digital signal which represent individual pixels are spread throughout the tape as recorded in such a manner that it is unlikely that a single dropout will affect adjacent pixel information. Consequently, each dropout rather than causing loss of several adjacent pixels of information causes a spread-out pattern of erroneous pixels each of which is surrounded by correct pixels.

Copending application Ser. No. 170,811, filed July 21, 1980 for Reitmeier and entitled "TWO DIMENSIONAL ADAPTIVE DROPOUT COMPENSATOR AND CHROMA INVERTER" describes an adaptive estimator which generates signals which may be substituted for dropped-out information. The estimator uses delay lines to simultaneously compare the rate of change of the magnitude of the video signal represented by the digital signal being processed in several spatial (in the plane of the raster) directions in the vicinity of the dropped-out pixel. The rate-of-change is determined in the vertical direction by taking the difference of the values of the pixels immediately above and below the raster position of the dropped-out pixels. The horizontal rate-of-change is determined by taking the difference in the values of the pixels to the right and to the left of the dropped-out pixel. Similarly, differences of pixels on two diagonals of the raster about the dropped-out pixel establish the rate of change of the signal in the diagonal directions. A logic circuit determines which rate of change is the least. An average signal interpolated between the two adjacent pixels in the direction adaptively selected as having the least rate of change is then substituted for the dropped-out pixel. If the raster display is, for example, a horizontal transition (upper half of the raster is white, lower half is black) and the dropped-out pixel is on the black side of the boundary line, the vertical and diagonal differences about the dropped-out pixel will represent a full video amplitude excursion, i.e., white minus black. In the horizontal direction, the difference will be zero. Zero results in the horizontal direction because the adjacent pixels in the horizontal direction will both have the same value, namely black. Since the least video amplitude difference in the example is in the horizontal direction, an average of the pixels to the right and to the left of the dropped-out pixel is substituted for the dropped-out pixel. The average in the horizontal direction about the dropped-out pixel will be the average of a black level and a black level, which is a black level. Consequently, the estimate is a black pixel. For the example given, this estimate is a perfect reproduction of the dropped-out pixel. A similar result would have been achieved in the case of a vertical transition, because the least-difference criterion would have required that an average in the vertical directon be substituted for the dropped-out pixel. This adaptive scheme produces an extremely high-quality estimate of the value of the dropped-out signal. If the digital video signals are directly recorded onto the tape or other recording medium, the amplitude of the digital pulses can be monitored to determine the presence of a dropout, and the described estimator can be enabled to correct the signal for dropouts to provide broadcast-quality performance.

In the case of a directly-recorded digital signal, no RF carrier is available which can be used to provide an indication of the existence of a dropout. A dropout corrector is desired which may be used with directly recorded video signals and which may be used to cause an estimator such as that described above to substitute a high-quality estimate of the video for the dropped-out sample.

SUMMARY OF THE INVENTION

A television dropout compensator compensates for signals from a source which signals are subject to dropouts. The compensator comprises an estimator coupled to the source of signals for forming an estimate of the value of each pixel of the signal. A comparator is coupled to the estimator and to the source of signals for comparing each pixel of the signal with the corresponding estimate formed by the estimator for generating an error signal representative of the difference between the two. A threshold arrangement is coupled to the comparator and to a reference signal source for comparing the error signal with the reference value and for generating a signal indicative of a dropout when the error signal exceeds the reference value. A gate is coupled to the threshold arrangement, to the source of signals and to the estimator for coupling the estimator to an output terminal of the dropout compensator in response to the dropout signal.

DESCRIPTION OF THE DRAWING

FIGS. 1 and 5 are block diagrams representing embodiments of the invention;

DESCRIPTION OF THE INVENTION

Figure 1:
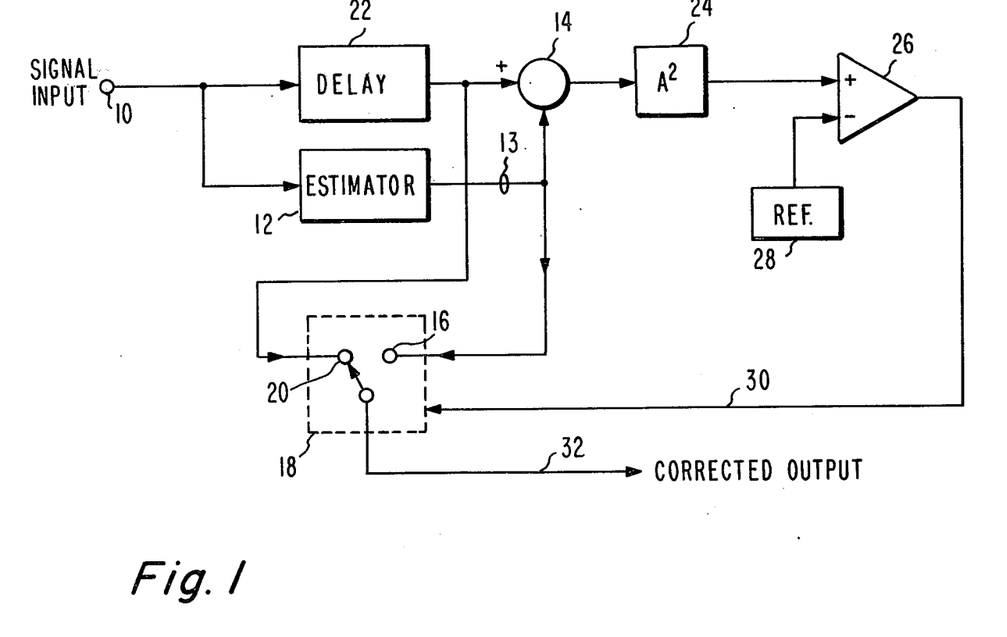

In FIG. 1, a video signal is applied to an input terminal 10 from a source (not shown) which causes the signal to be subject to dropouts. The video signal applied to terminal 10 is coupled to an input of an estimating circuit 14 which makes an estimate of the magnitude of each picture element or pixel based upon the values of the surrounding pixels. A continuous flow of estimated pixels is coupled from the output of estimator 12 to the inverting input of a summing circuit 14. The flow of estimated pixels is also applied to a terminal 16 of a multiplexer 18 which functionally acts as a switch. The video signals applied to input terminal 10 are also coupled to the noninverting input of summing circuit 14 and to another input terminal 20 of multiplexer 18 by way of a delay circuit 22. Delay circuit 22 is intended to delay the signal applied to the noninverting input terminal of summing circuit 14 to compensate for any delays occurring in estimator 12 so that the estimate of the value of a pixel is applied to the summing circuit at the same time as the corresponding unprocessed pixel. Summing circuit 14 subtracts from the signal applied to its noninverting input the value of the signal estimated by estimator 12. The difference signal from summing circuit 14 is applied to a squaring circuit 24 which multiplies the signal by itself and thereby eliminates negative values of difference. The squared difference signal is applied to the noninverting input terminal of a comparator 26 for comparison with a reference signal applied to the noninverting input terminal from a reference signal generating circuit 28. Comparator 26 compares the squared difference signal with the threshold value and generates on a conductor 30 a multiplex circuit control signal. The multiplex circuit control signal will be high when the squared signal exceeds the reference value and low when it does not. So long as the estimate and the actual video signal have values which are reasonably close to each other the control signal on conductor 30 is low, but when the actual video signal applied to the noninverting input terminal of summing circuit 14 differs appreciably from the estimated value applied to the inverting input terminal, the multiplex control signal is high and indicates a dropout. Multiplex circuit 18 as described acts as a switch under the control of the multiplex circuit control signal on conductor 30. Under normal conditions, the delayed video signal applied to terminal 20 of multiplex circuit 18 is coupled to the output conductor 32 of the dropout corrector of FIG. 1. When the control signal on conductor 30 goes high, multiplex circuit 18 switches, thereby coupling the estimated signal applied to terminal 16 to output conductor 32 of the dropout corrector.

As described, the arrangement of FIG. 1 is a dropout compensator for video signals which creates an estimate of the value of each pixel and which compares the actual and estimated value. When the actual value is approximately equal to the estimated value, the actual value is coupled to the output for display. If the actual value differs significantly from the estimate, the estimate is coupled to the output terminal.

It will be appreciated that the arrangement of FIG. 1 may be adapted to operate upon either analog or digital signals, as the blocks illustrated in FIG. 1 are general and do not differentiate between analog and digital. It will be understood that a dropout corrector based upon the aforementioned principle can only be as good as the estimates generated by the estimator.

In a preferred embodiment of the invention, the estimator is an adaptive selector which uses averaging in one of a plurality of directions to replace dropout data, where the selection is based on averaging in the direction of minimum change. In the preferred embodiment, it is desired to use either horizontal or vertical averaging to generate the replacement dropout data from a digital television signal. Good adjacent horizontal and adjacent vertical information is made available in a tape recorder context by choice of proper tape format. Estimates of the values of each pixel can be generated from the values of pixels above, below, to the left and to the right, of the pixel being estimated. These estimates are denoted as $\hat{f}_T$(top), $\hat{f}_L$(bottom) and $\hat{f}_R$ respectively. The horizontal estimate of the data is then $\hat{f}_H = \frac{1}{2}(\hat{f}_L + \hat{f}_R)$, while the vertical estimate is $\hat{f}_V = \frac{1}{2}(\hat{f}_B + \hat{f}_T)$.

The value used as a replacement of lost data, f, is then given by $f = \hat{f}_H$, if $|\hat{f}_L - \hat{f}_R| \leq |\hat{f}_B - \hat{f}_T|$, or $\hat{f} = \hat{f}_V$ if otherwise.

In other words, the criterion for the selection of the data reconstruction is the minimum difference of the components of the horizontal and vertical estimates, although it should be understood that any portion of those estimates (such as that portion representing only luminance information) can be used. The sampling frequency of the digital television signal preferably is at four times the highest frequency included in the television video signal, which is the color subcarrier signal. Four times the color subcarrier frequency is 14.32 MHz for an NTSC video signal. In such a signal, the chrominance component (C) is the sum of an I signal and a Q signal which are in time quadrature with each other and which have the chrominance subcarrier frequency. The phase of the recurrent sampling is chosen for explanatory purposes so that a first of the sampling times occurs when the I signal is a maximum. At this sampling time the Q signal is at minimum amplitude or zero due to the ninety-degree phase shift therebetween. Thus, the sampled signal at said first sample time comprises the luma and the I signal (Y and I). The second sample time occurs at a period of 1/14.32 MHz=70 nanoseconds after the first sample time. This sample occurs one-quarter of a subcarrier period (90°) later so that I=0 and Q has its maximum value. Thus, the sample of the video signal at the second sampling time represents Y+Q. The third sampling time corresponds to a total phase shift of 180 degrees of the subcarrier signal from the first sampling time. Again, I has a maximum value in the negative direction while Q=0. Thus, the sampled signal is Y−I. The fourth sampling time has a total phase shift of 270 degrees from the first sampling time. The Q signal is at its negative maximum, while I=0. Thus, the sampled signal is Y−Q. The fifth sampling time has a 360 degree phase relationship with respect to the original sampling time, which means that the sampled signal is in-phase with the signal at the first sample time, so that the sampled signal again represents Y+I. Thus, the recurrent samples sequentially represent Y+I, Y+Q, Y−I, Y−Q, Y+I, Y+Q, Y−I, etc., for a total of 63.5 $\mu$s/70 ns, or 910 samples per line for an NTSC signal. However, it should be understood that sampling may occur at any phase relative to color burst rather than at the phase selected for explanatory purpose along the I and Q axes and will nevertheless produce equivalent results.

FIG. 1 shows samples represented by arrows for three vertically adjacent television lines of a scanning raster. The straight lines 116, 118 and 120 represent the luminance (Y) signal which is constant over the area shown in FIG. 1. The zero values to which the luminance components 116, 118 and 120 relate are not shown. The sinewaves 122, 124 and 126 representing a color subcarrier signal are shown for the top, middle and bottom lines, respectively, of the area in question. The magnitude of the color subcarrier signal represents color saturation and its phase relative to a standard phase represents hue. The saturation and hue are a constant over the area shown in FIG. 1. It is noted that for the same color, sinewave 124 is 180° out-of-phase with respect to the sinewaves 122 and 126 due to the inversion of the subcarrier phase with respect to the horizontal sync pulse between adjacent lines within a field. The total voltage existing at any time is the sum of the luminance signal plus the instantaneous value of the sinusoidal chrominance signal. In the following discussion, "v" represents the signal voltage at any sampling time or point, the subscripts "t", "m", and "b" represent the "top", "middle" and "bottom" lines respectively, while the letter "n" with a numeral represents the sample point in question with respect to a selected center sample point. Consider now center sample value $V_M(n)$ at point N on middle line 118. It will be noted that the signal at this point comprises Y−Q. For the sample points immediately to the left and to the right of point $V_M(n)$, the type (I or Q) and polarity of the chrominance component alternates as explained above. The top and bottom lines 116 and 120 are similar except for a phase inversion of the chrominance component.

While the arrangement to be described forms estimates continuously of signals which are error-free as well as of signals containing errors, an error pattern will be assumed which might arise in a tape recorder context using a time spreading code as explained below. Observing the error pattern in FIG. 1, it is samples $V_M(n)$, $V_M(n+4)$, $V_M(n-4)$, etc. that are in error, i.e., every fourth sample is in error. These samples occur at times or positions in which the sampled signals represent Y−Q. Note that samples $V_M(n-1)$ and $V_M(n+1)$ horizontally adjacent to sample $V_M(n)$ now under consideration represent signals of the form Y−I and Y+I, so that the I component cancels when they are averaged and the resultant is the estimated value of Y at sample $V_M(n)$ since the picture is assumed to have little change over the area shown in FIG. 1. Other horizontally adjacent samples of Y−I and Y+I may be included in a weighted average to obtain a better estimate of the luminance Y, as shown in a following example. Since samples $V_M(n-2)$ and $V_M(n+2)$ are of the form Y+Q, subtracting the average of these two samples from the computed value of Y as obtained above results in a signal having a −Q component. This can then be added to Y to form a Y−Q signal, which is the replacement value for the sample in error $V_M(n)$.

This procedure can be applied to the three vertically adjacent lines, in order to use the previously described adaptive feature. The luminance values of the signal to the top, bottom, left, and right of point $V_M(n)$ are respectively computed as shown below as a weighted sum ($\alpha$ and $\beta$ are some fixed coefficients) of surrounding samples which contain the desired information:

$$y_T(n) = \beta v_T(n-3) + \alpha v_T(n-1) + \alpha v_T(n+1) + \beta v_T(n+3) \quad (1)$$

$$y_B(n) = \beta v_B(n-3) + \alpha v_B(n-1) + \alpha v_B(n+1) + \beta v_B(n+3) \quad (2)$$

$$y_L(n) = \beta v_M(n-3) + \alpha v_M(n-1) \quad (3)$$

$$y_R(n) = \alpha v_M(n+1) + \beta v_M(n+3) \quad (4)$$

The adaptive criterion is applied to the luminance results to select the direction of further processing. (The entire reconstruction, i.e., both Y and C components, or any portion thereof, e.g., just Y or C components, can be used to select the appropriate direction.) Therefore, if $2|Y_L - Y_R| \leq |Y_T - Y_B|$, (the factor 2 is needed since twice as many terms are in $Y_T$ and $Y_B$ as are in $Y_L$ and $Y_R$), the picture as represented by the value of the video signal changes less in the horizontal direction than in the vertical direction and a more accurate reconstruction can be achieved by proceeding with a reconstruction horizontally:

The luminance at the pixel being reconstructed or estimated is $$Y_{LR} = Y_L + Y_R \quad (5)$$

and the chrominance value is $$\hat{C} = \tfrac{1}{2}[v_M(n-2) + v_M(n+2)] - \hat{Y} \quad (6)$$

The composite video signal will have a value $$\hat{v}_M(n) = \hat{Y} - \hat{C} = 2\hat{Y} - \tfrac{1}{2}[v_M(n-2) + v_M(n+2)] \quad (7)$$

If $|Y_T-Y_B|<2|Y_L-Y_R|$, the picture changes less vertically than horizontally, so the estimated value is determined by proceeding vertically:

$$\hat{Y}_{TB}=\tfrac{1}{2}(Y_T+Y_B) \tag{8}$$

$$\hat{C}=\tfrac{1}{2}[v_T(n)-Y_T+v_B(n)-Y_B] \tag{9}$$

$$\hat{v}_M(n)=\hat{Y}-\hat{C} \tag{10}$$

Thus, an adaptive estimate or reconstruction of present sample $V_M(n)$ can be made.

Figure 3:
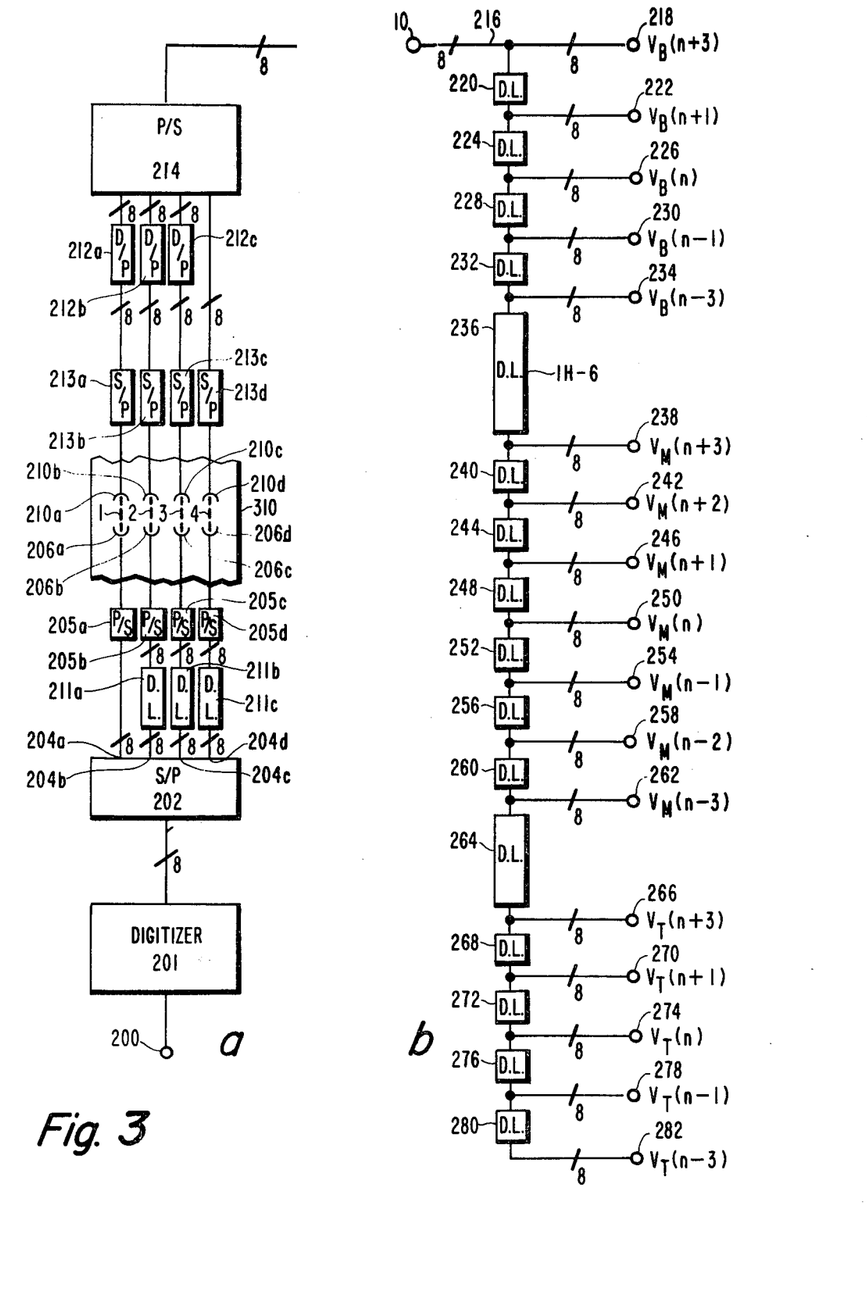
FIGS. 3 and 4 are block diagrams representative of details of the arrangements of FIGS. 1 and 5.

FIG. 3 shows a portion of the apparatus used to implement the above estimating concept. An analog video signal is received at terminal 200 from a video source (not shown), e.g., a television camera. The signal is sampled and 8-bit quantized, i.e., divided into 256 grey levels, by digitizer 201. For purposes of further discussion, the 8-bit samples from digitizer 201 are sequentially numbered in order of their time occurrence at the output of digitizer 201, e.g., 1, 2, 3, etc. These samples are applied to a series-to-parallel converter 202 in order to convert four sequential samples into four time coincident samples on four conductors or lines, e.g., the eight bits each of samples 1, 2, 3 and 4 appear simultaneously on lines 204a–204d, and are then simultaneously replaced by samples 5, 6, 7 and 8, etc. Outputs 204 of converter 202 supplies samples to parallel-to-series converters 205 and from there the samples are applied to recording heads 206 in order to record four tracks on a magnetic recording tape 310. Each path has a different delay. The exact delay is not critical, but should be longer than the longest expected dropout length.

Tracks 1, 2, 3 and 4 are reproduced by reproducing heads 210 and the signals therefrom are respectively applied to series-to-parallel converters 213 which convert the serial input data to simultaneous data on a pixel-by-pixel basis. The signals from converters 213 are applied to delay lines 212 and to parallel-to-series converter 214. Thus, it will be appreciated that the signals from tracks 1, 2, 3 and 4 are in the same time coincidence when they are applied to the converter 214 as when they emerged from series-to-parallel converter 202. The output signal from parallel-to-series converter 214 comprises the samples in their original sequential order. The effect of the recorder arrangement of FIG. 3 is to cause the effect of a tape dropout to be spread throughout the tape. In effect, it guarantees that any pixel which may be affected by a single dropout of normal length or less will be surrounded in raster space by pixels which are unaffected by the dropout and which are therefore correct.

FIG. 3b illustrates an arrangement for generating estimates for reconstructing the value of each pixel. In FIG. 3b, 8-bit digital video signals are applied in parallel over an 8-bit terminal 10 from a source which may be a recorder configured as in FIG. 3a to an output terminal 218 and to a delay-line chain. The delay-line chain provides samples from the various lines in time coincidence for the dropout compensator. Output terminal 218 coupled directly to converter 214 provides sample $V_B(n+3)$. Delay line 220 has a delay of two sampling periods or 140 nanoseconds for a 14.32 MHz sampling frequency, and thus the signal at output terminal 222 is sample $V_B(n+1)$. Delay line 224 has a delay time of one sampling period (70 nanoseconds), and thus the signal at output terminal 226 is sample $V_B(n)$. Delay line 228 has a delay time of one sample period (70 nanoseconds) and thus the signal at output terminal 230 is sample $V_B(n-1)$. Delay line 232 has a delay of two sampling periods (140 ns), and thus the signal at output terminal 234 is sample $V_B(n-3)$. Delay line 236 has a delay of one horizontal line minus six sample periods (63.5 μs-420 ns), and thus output terminal 238 provides sample $V_M(n+3)$. Delay line 240 has a delay of one sampling period, and thus provides at terminal 242 sample $V_M(n+2)$. Delay line 244 has a delay of one sample period and thus provides at output terminal 246 sample $V_M(n+1)$. Delay line 248 has a delay of one sample period and thus provides at output terminal 250, the sample $V_M(n)$, the sample to be estimated. The estimated value has an average time delay equal to that of the signal at terminal 250, since terminal 250 is at the center of delay line chain 216. Therefore, the estimated value will be in time coincidence with the sample at terminal 250, hence terminal 250 is used as the source of the output video data to the noninverting input of summing circuit 1w of FIG. 1 when no dropout occurs to avoid a time shift when switching between the unprocessed or correct pixels and the estimated values.

Figure 2:
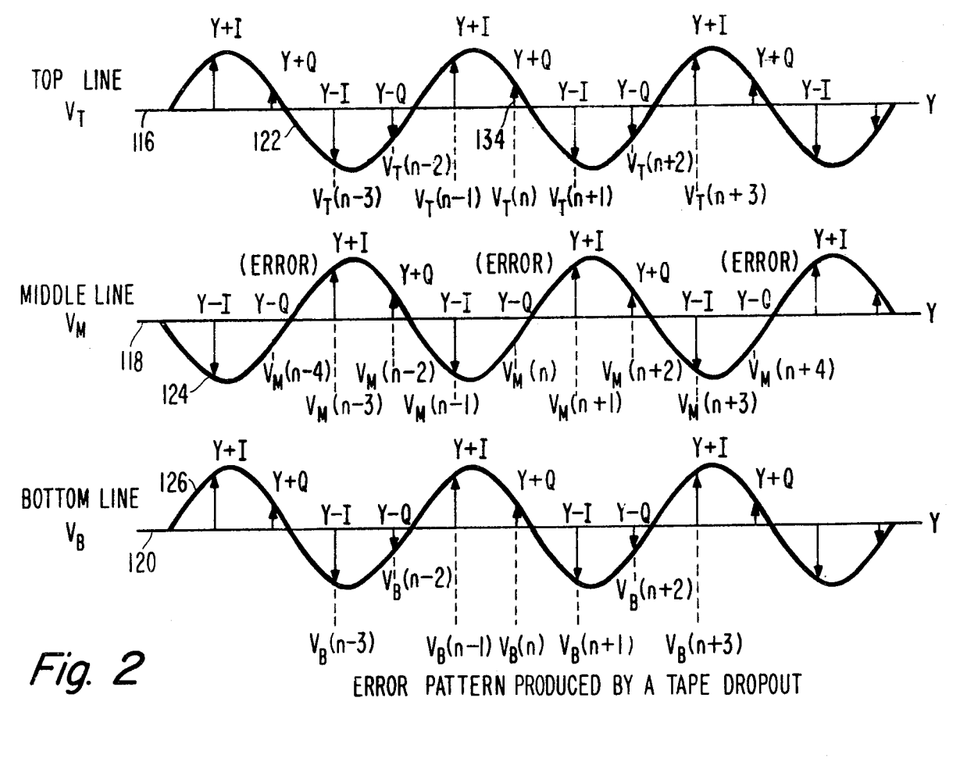
FIG. 2 is an amplitude-time plot of video signals useful in understanding the invention.

The delay arrangement of FIG. 2c may be included as part of delay 22 in FIG. 1, or it may be incorporated as part of estimator 12 so long as a separate delay 22 is incorporated.

The remaining half of delay line chain 216 is symmetrical to the above-described first half. Briefly, delay lines 252, 256, 260, 264, 268, 272, 276, and 280 have sample period delays of one, one, one horizontal line minus six samples, two, one, one, and two sample periods respectively, and provide at output terminals 254, 258, 262, 266, 270, 274, 278 and 282 respectively the indicated signals for the middle and to lines 118 and 116.

Figure 4:
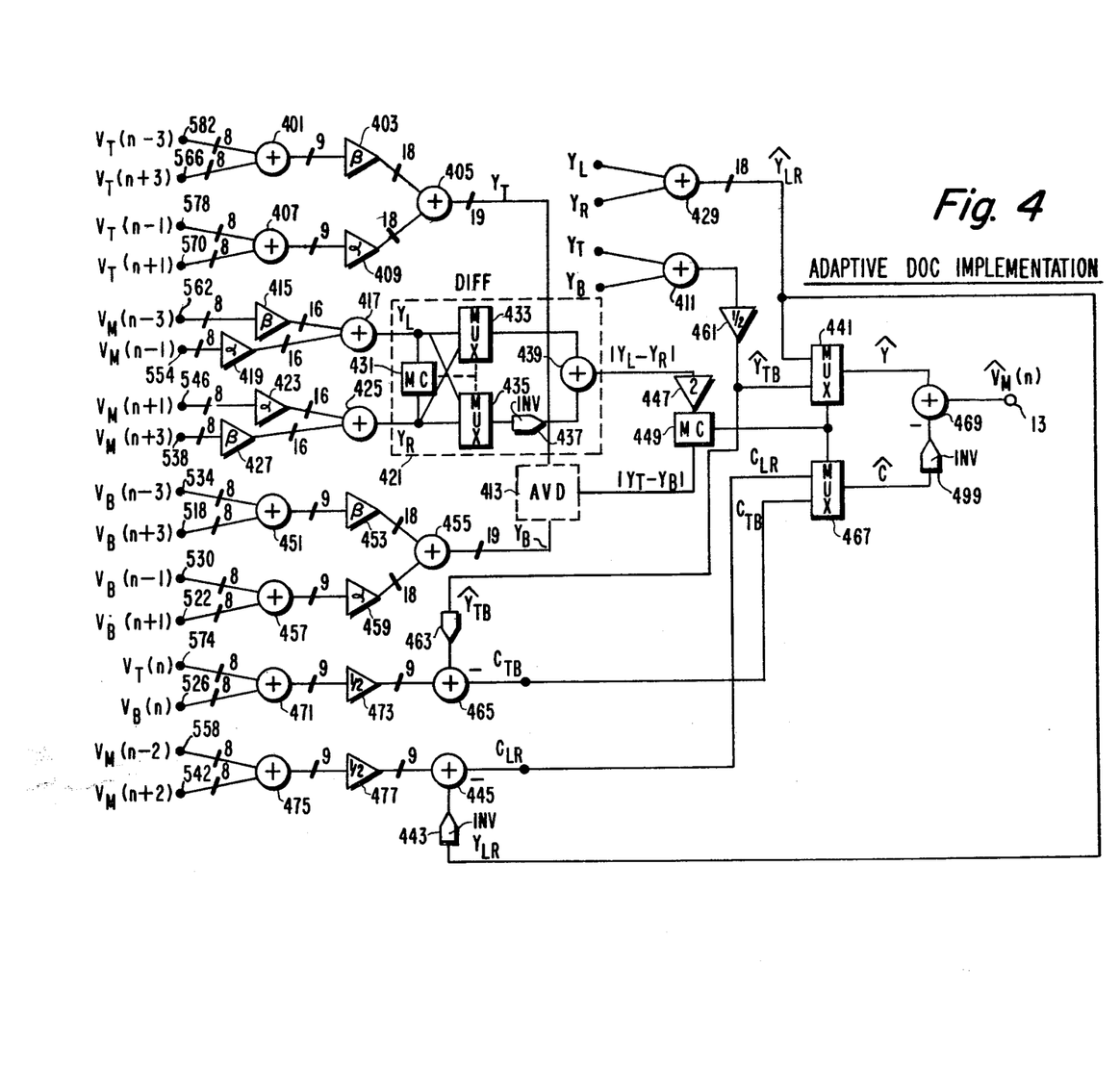

FIG. 4 is a block diagram of a logic circuit adapted to carry out the arithmetic computations required to adaptively compensate for dropouts. Eight-bit input terminals 542–582 at the left of FIG. 4 respectively coupled to the output terminals of FIG. 2 that have the same last two digits, e.g., output terminal 282 is coupled to input terminal 582, 266 is coupled to 566, etc. The designation of the signals received at each terminal are shown at the left of the terminal.

In order to compute the top luminance estimate signal $Y_T$ as defined in equation (1), eight-bit adder 401 receives signals from terminals 582 and 566 and supplies the resultant sum to a multiplier 403 which multiplies said sum by the multiplier $\beta$. Multiplier 403 supplies the resulting product to adder 405. Adder 407 receives the signals at inputs 578 and 570 and supplies the resulting sum to multiplier 409, which multiplies said sum by the multiplier $\alpha$. Multiplier 409 applies the resulting product to adder 405. The resulting output sum from adder 405 is the signal $Y_T$, which signal is applied to adder 411 and absolute-value-of-the difference producer (AVD) 413.

In order to compute the left luminance estimate signal $Y_L$ as defined in equation (3), the signal at terminal 562 is applied to multiplier 415, which multiplies said signal by $\beta$ and then applies the resulting product to an adder 417. The signal at terminal 554 is applied to multiplier 419 for multiplication by $\alpha$, the resulting product being applied to adder 417. The sum output signal from 417 is the left estimate signal $Y_L$, and this sum is applied to adder 429 and also to AVD 421, which AVD 421 has a construction which is the same as that of AVD 413.

To produce the right estimate signal $Y_R$ as defined by equation (4), multiplier 423 multiplies the signal at terminal 546 by the factor α, and applies the resulting product to adder 425, while multiplier 427 multiplies the signal at input 538 by β, and also applies the resulting product to adder 425. The resulting sum signal from adder 425 comprises the right estimate signal $Y_R$ that is applied to AVD 421, as well as to adder 429. Adder 429 supplies as its output signal a combined left and right estimate signal $\hat{Y}_{LR}$ as defined by equation (5) to MUX 441 and inverter 443 (at the bottom of FIG. 4), which inverter supplies the inverter $\hat{Y}_{LR}$ signal to adder 445.

AVD 421 comprises a magnitude comparator 431 that receives at its inputs the $Y_L$ and $Y_R$ signals and supplies control signals to MUX 433 and 435. The control signal is determined by which of the signals $Y_L$ and $Y_R$ is greater and insures that MUX 433 supplies the greater of said signals, and that MUX 435 supplies the lesser of said signals $Y_L$ and $Y_R$ to inverter 437. Thus, adder 439 always supplies at its output a signal representing a positive number that is the difference between its input signals, i.e. $|Y_L - Y_R|$, to multiplier 447. Multiplier 447 multiplies the signal from adder 439 by two, and supplies the resulting product to a magnitude comparator 449.

In order to compute the bottom line luminance estimate, $Y_B$ as defined in equation (2), adder 451 receives signals from terminals 534 and 518 and supplies the resulting sum to multiplier 453 which multiplies said sum of β and applies the resulting product to adder 455. Adder 457 receives at its inputs signals from terminals 530 and 522 and applies the resulting sum to multiplier 459 which multiplies the sum by α and applies the resulting product to adder 455. The output signal from adder 455 is the bottom line estimate $Y_B$, which is applied to adder 411, as well as to AVD 413. The sum output signal from adder 411 is divided by two in multiplier 461. The resulting quotient is the top-bottom luminance estimate as defined by equation (8), and the estimate is applied to MUX 441 and to inverter 463 and from inverter 463 to adder 465. AVD 413 supplies at its output the absolute value of the difference between the top and bottom line estimates $|Y_T - Y_B|$ and applies the difference to magnitude comparator (MC) 449. Comparator 449 supplies a control signal to MUX 441 and 467 in accordance with whichever difference $|Y_L - Y_R|$ or $|Y_T - Y_B|$ is smaller. Thus, MUX 441 supplies to adder 469 whichever of the luminance estimates $\hat{Y}_{TB}$ or $\hat{Y}_{LR}$ is a better match to the luminance component of $V_M(n)$ of the sample point in question.

In order to compute the top-bottom chrominance estimate as defined by equation (9) adder 471 receives the signals at terminals 574 and 526 and supplies the resulting sum to multiplier 473 which divides said sum by two. The resulting product is applied to adder 465, which has the negative of the top-bottom luminance applied to it from inverter 463. The sum output signal from adder 465 is the top-bottom chrominance estimate $C_{TB}$, and this estimate is applied to MUX 467.

To compute the left-right chrominance estimate, as defined by equation (6), adder 475 receives the signals at terminals 558 and 542. The resulting sum is multiplied by one-half in multiplier 477. The resulting product is applied to adder 445, which has the negative left-right luminance estimate applied to it from inverter 443. The resulting sum from adder 445 is the left-right chrominance estimate $C_{LR}$, which is applied to MUX 467.

MUX 467 supplies to inverter 479, under the control of the control signal from comparator 449, whichever of the chrominance estimates (left-right or top-bottom) is a better match to the chrominance component of the sample point $V_M(n)$. Adder 469 adds the best estimate of the luminance and the negative of the best estimate of the chrominance signal together to form a Y−C signal as in equations (7) or (10) at output terminal 13 which is an adaptive estimate for the sample $V_M(n)$. The estimates are produced continually in the manner described.

FIG. 5 illustrates another embodiment of the invention for dropout compensation of digital signals, the arrangement of FIG. 5 is similar to that of FIG. 1 except that delay 22 is replaced by a delay 500, estimator 12 is replaced by an estimator 502 and the combination of summing circuit 10 and squaring circuit 24 is replaced by an AVD circuit illustrated as a block 504. In FIG. 5, all the elements are adapted for digital signal processing. Delay 500 is an array of delay lines similar to that described in conjunction with FIG. 3b, and estimator 502 corresponds with the estimator of FIG. 4. The signal coupled from delay 500 to summing circuit 14 and to terminal 16 of switch 18 corresponds with the mid-delay signal $V_M$ on terminal 250. AVD circuit 504 generates a difference signal $f(n) - \hat{f}(n)$ from unprocessed signal $f(n)$ and estimate $\hat{f}(n)$ and produces a magnitude signal $|f(n) - \hat{f}(n)|$ having no negative value as described previously for an AVD circuit. The comparator 26 operates as described in conjunction with FIG. 1 to compare the AVD magnitude signal with a reference to threshold signal for producing a control signal on conductor 30 for controlling switch 18 to gate to an output conductor either the estimate or the unprocessed signal, without the need for a separate dropout detector circuit.

Other embodiments of the invention will be apparent to those skilled in the art. For example, the dropout compensator may be applied independently to each channel of video of a component video signal (YIQ, RGB, etc.)

What is claimed is:

1. A television dropout compensator for video signals from a source of video signals which video signals are subject to dropouts, comprising:
    estimating means coupled to the source of video signals for forming an estimated signal representing an estimate of the value of each pixel of said video signals;
    comparison means coupled to said estimating means and to said source of signals for comparing each pixel of said video signal with the corresponding estimated signal for generating an error signal representative of the difference therebetween;
    threshold means coupled to said comparison means for comparing said error signal with a reference value and for generating a dropout signal when said error signal exceeds said reference value; and
    gating means coupled to said threshold means, to said source of signals and to said estimating means for coupling said estimating means to an output terminal of the dropout compensator in response to said dropout signal.

2. A dropout compensator according to claim 1 wherein said gating means decouples said source from said output terminal in the absence of said dropout signal.

3. A dropout compensator according to claim 1 further comprising delay means coupled to said source and to said comparison means for causing said video signal to arrive at said comparison means at the same time as the corresponding estimated signal.

4. A dropout compensator according to claim 3 wherein said delay means is further coupled to said estimating means for providing to said estimating means samples of said video signal representing times other than that of the currently processed pixel.

5. A dropout compensator according to claim 4 wherein said times are times advanced from and retarded from that of said currently processed pixel.

6. A dropout compensator according to claim 1 wherein said error signal is unipolar and said comparator means comprises:
  summing means coupled to said source of video signals and to said estimating means for forming bipolar signals from said video signals and said estimated signals; and
  rectifying means coupled to said summing means for producing said unipolar error signal from said bipolar signal.

7. A dropout compensator according to claim 6 wherein said rectifying means comprises squaring means for multiplying said difference signal by itself and thereby producing said unipolar signal with a magnitude different from the magnitude of said bipolar difference signal.

8. A dropout compensator according to claim 6 wherein said rectifying means comprises absolute-value means for generating said unipolar error signal with a magnitude equal to that of said bipolar error signal.

9. A method of compensating for dropouts in a video signal, comprising:
  making an estimate of the value of the video signal;
  comparing said estimated value of the video signal with said video signal for obtaining a difference signal indicative of the difference therebetween;
  determining whether the magnitude of said difference signal is greater than or less than a predetermined magnitude; and
  substituting for said video signal said estimated value of the video signal when the determination is that said difference signal exceeds said predetermined magnitude.

10. A method of detecting dropouts in a video signal, comprising:
  making an estimate of the value of the video signal;
  comparing said estimated value of the video signal with said video signal for obtaining a difference signal indicative of the difference therebetween; and
  establishing the presence of a dropout by determining if the magnitude of said difference signal is greater than a threshold.

11. A television dropout compensator for video signals from a source of video signals which video signals are subject to dropouts, comprising:
  adaptive estimating means for producing an estimated signal representing the value of a pixel of said video signals, said adaptive estimating means comprising:
    delay means for providing pixel amplitude signals from pixels preceding and following a currently processed pixel;
    first averaging means coupled to said delay means for producing a first estimate of the value of said currently processed pixel by processing pixels from horizontal lines preceding and following the line containing said currently processed pixel;
    second averaging means coupled to said delay means for producing a second estimate of the value of said currently processed pixel by processing pixels preceding and following said currently processed pixel on said line containing said currently processed pixel;
    absolute-value means coupled to said delay means for producing first and second signals representative of the magnitude of the rate of change of the values of the pixels in first and second directions, respectively;
    comparison means coupled to said absolute-value means for generating a control signal indicative of the one of said first and second signals having the least magnitude; and
    gating means coupled to said first and second averaging means and to said comparison means for gating to an output terminal of said adaptive estimating means one of said first and second estimates under the control of said control signal for forming said estimated signal; said television dropout compensator further comprising:
  second comparison means coupled to said adaptive estimating means and to said source of video signals for comparing each pixel of said video signal with the corresponding pixel of said estimated signal for generating an error signal representative of the difference therebetween;
  threshold means coupled to said second comparison means for comparing said error signal with a reference value and for generating a dropout signal when said error signal exceeds said reference value; and
  gating means coupled to said threshold means, to said source of video signals and to said adaptive estimating means for coupling said estimated signal to an output terminal of said dropout compensator in response to said dropout signal.

* * * * *